Aug. 13, 1935.   A. Y. DODGE   2,011,101
VARIABLE SPEED TRANSMISSION
Original Filed Nov. 7, 1930   4 Sheets-Sheet 1

Aug. 13, 1935. A. Y. DODGE 2,011,101
VARIABLE SPEED TRANSMISSION
Original Filed Nov. 7, 1930 4 Sheets-Sheet 4

INVENTOR.
A. Y. Dodge
BY
ATTORNEYS

Patented Aug. 13, 1935

2,011,101

UNITED STATES PATENT OFFICE 2,011,101

VARIABLE SPEED TRANSMISSION

Adiel Y. Dodge, South Bend, Ind.

Refiled for abandoned application Serial No. 493,950, November 7, 1930. This application April 19, 1934, Serial No. 721,296

39 Claims. (Cl. 74—260)

My invention relates to variable speed transmissions.

One of the objects of my invention is to provide an improved variable speed transmission in which the speed may be changed without the shifting of gears. For ordinary operations no shift is required. A positive clutch is provided for low speed or for heavy pulling as in sand.

A further object is to provide an improved variable speed transmission which does not require the use of a special reverse gear in order to reverse the rotation of the driven member.

A further object of my invention is to provide an improved variable speed transmission comprising a gearing which is part of the transmission and also acts to propel a fluid, which fluid can be variably controlled to vary the speed ratio.

A further object is to provide an improved transmission involving a fluid flow variably controlled by the action of centrifugal force.

A further object is to provide improved means for controlling a variable speed transmission.

A further object is to provide improved means for controlling a variable speed transmission of the planetary type.

A further object of my invention is to provide a construction comprising a planetary gear and a one-way reactance clutch in series, whereby two torque multiplications may be secured, one due to the usual torque multiplication of the planetary gearing and the other due to the impulse action of the transmission in combination with the one-way reactance clutch.

Further objects will appear from the description and claims.

In the drawings, in which several embodiments of my invention are shown—

Figure 9 is a vertical section showing the use of a magnetic clutch or speed controller instead of friction shoes or inertia rollers;

The construction shown in Figures 1 to 5 inclusive comprises a planetary transmission for automobiles and control means therefor, (the planetary transmission including a sun gear 1 mounted on the motor shaft 2, a pair of planet gears 3 meshing with the sun gear, a gear carrier 4 rotatably mounted about the axis of the motor shaft 2, on which the planet gears 3 are mounted, and a driven ring gear 5 meshing with the planet gears 3 and coaxial with the gear carrier), a propeller shaft 6 connectible with the gear carrier 4 for all forward speeds and connectible with the driven gear 5 for reverse speed, means (including a manually operable rock lever 7 mounted adjacent the steering wheel 8 and oscillatable about the axis of the steering column 9, means for alternatively connecting the driven propeller shaft 6 with the gear carrier 4 or with the driven gear 5, means (including a pedal and a gripping band 10 operable by the driver operated by the pedal) for holding the gear carrier 4 against rotation to cause the driven gear 5 to rotate in a direction reverse to that of the driving sun gear 1, friction holding means (including a pivotally mounted friction shoe 11) pivotally mounted on the driven gear 5 and engageable with the gear casing 12 tending to hold the driven ring gear 5 against movement to cause rotation of the gear carrier 4 for slow speed forward, means (including a weight 13) actuated by centrifugal force for freeing the friction shoe 11 at high speeds of the ring gear 5, means (including a slidable cone 14 operated by the clutch pedal 15) whereby when the gear carrier 4 is held against rotation for reverse speed said friction shoe 11 will be released, and means (including fluid passages 15 and 16 and fluid-controlling valves 17 and 18 controlled by centrifugal force) tending to cause the driven ring gear 5 to rotate with the gear carrier 4 for high speed forward.

The fluid is caused to flow through the fluid passages if there is any relative movement of the ring gear with respect to the planet gears, the teeth of the gearing acting as a gear pump to cause the circulation of the fluid which is preferably some lubricating liquid.

Before describing the construction in detail, I will describe in general certain operations of parts of the mechanism, particularly the control means for the transmission.

Reverse

Assuming that the motor is running and that the ring gear 5 is stationary because of the engagement of the friction shoe 11 with the gear casing 12, the rock lever 7 is operated to connect the positive clutch member 19 of the propeller shaft 6 with the clutch members 20 on the ring gear 5. The pedal 15 is then depressed causing the friction shoe 11 to be released from engagement with the gear casing 12 by the action of the sliding cone 14 which engages the inner end 21 of the rock lever 22 on which the shoe 11 is mounted and causing the gripping band 10 to grip the drum 24 secured to the hub 25 of the gear carrier 4. The gear carrier 4 is thus held against rotation and the ring gear 5 which is clutched with the propeller shaft 6 is free to rotate in a direction to cause reverse movement and does so rotate because of the action of the planet gears 3 which are mounted on the then stationary gear carrier 4. The speed ratio of the propeller shaft 6 to the motor shaft 2 is equal to the number of teeth on the sun gear 1 divided by the number of teeth on the ring gear 5.

Figure 2:
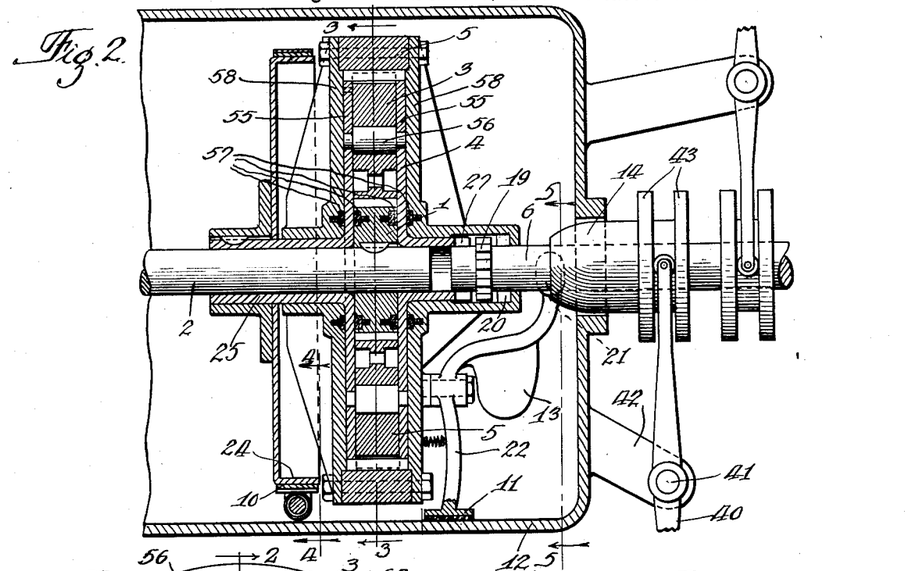
Figure 2 is an axial section through the transmission on the line 2—2 of Figure 3.

To stop reverse movement the pedal 15 is released and raised by the action of the spring 26 to free the gripping band 10 and to cause the slidable cone 14 to move to the right as viewed in Figure 2, permitting the friction shoe 11 to engage the casing 12 and stop the reverse rotation of the driven ring gear 5. As the propeller shaft 6 is at this time connected with the driven ring gear 5 the propeller shaft will stop also. If the engine is left running it will cause the sun gear 1 and gear carrier 4 to rotate idly without effecting any movement of the propeller shaft.

Low speed forward

For low speed forward, the motor is put in operation, the pedal 15 is depressed to hold the gear carrier 4 against rotation, and to release the ring gear 5 for rotation, the rock lever 7 is operated to shift the propeller shaft clutch member 19 into engagement with the clutch teeth 27 of the gear carrier 4 and the pedal 15 is then released and raised by the spring 26 to release the gear carrier 4 for rotation and to allow the friction shoe 11 to engage the casing 12 to stop the reverse rotation of the ring gear 5. The ring gear 5 is now held stationary and the gear carrier 4 rotates at a speed which gives a positive low speed forward for the propeller shaft 6. The speed ratio of the gear carrier 4 with respect to the sun gear 1 is equal to the number of teeth in the sun gear divided by the number of teeth in the ring gear plus the number of teeth in the sun gear.

Intermediate speed forward

During the comparatively slow rotation of the motor shaft 2 the gear carrier 4 will rotate at a relatively low speed and the two valves 17 and 18 controlled by centrifugal force will remain in their innermost position permitting free circulation of the oil through both passages 15 and 16. However, as the speed of rotation of the motor increases the speed of rotation of the spider gear carrier 4 increases correspondingly and when a certain predetermined speed is reached the valve 17 closes almost instantly against the action of its light spring 28 so that thereafter the entire fluid flow must be through the passage 16. This will cause an increased resistance to fluid flow and a consequent resistance to relative rotation between the gear carrier 4 and driven gear 5, which resistance will continue to build up until a force is exerted on the ring gear 5 sufficient to overcome the rather slight holding tendency of the friction shoe 11 to counter clockwise motion, as viewed in Figure 4, whereupon the ring gear 5 will begin to rotate in the same direction as the gear carrier 4.

As the motor speed continues to increase and, consequently, the speed of the gear carrier 4, the effect of centrifugal force on the valves 17 and 18 will continue to increase in proportion to the square of the speed and will move the valves farther and farther outward to restrict more and more the flow through the fluid passages 15 and 16. This will cause a constantly increasing resistance to relative rotation between the gear carrier 4 and the ring gear 5 and will bring the ring gear more nearly to a speed of rotation equal to that of the gear carrier. When the speed of the gear carrier has increased to a point at which the passages 15 and 16 are completely closed off, there can be no further relative rotation between the gear carrier and ring gear, and the sun gear, gear carrier and ring gear will rotate as a unit so that the speed of the propeller shaft 6 will then be the same as the speed of the motor shaft 2.

High speed forward

As indicated above, during high speed forward, the fluid passages 15 and 16 are completely closed and there is no relative rotation between the ring gear and gear carrier so that the whole transmission including the motor shaft, the planetary gearing and the propeller shaft rotate together as a unit at the motor speed.

To stop the car in its forward travel, the motor speed would probably be throttled down and the pedal 15 is depressed to grip the drum 24 secured to the gear carrier 4 and to release the friction shoe 11 from engagement with the gear casing 12. This slows down the speed of rotation of the gear carrier 4 (and consequently of the driven shaft 6 if the latter is connected with the gear carrier) lessening the centrifugal force on the valves 17 and 18 causing the valves to open and permit slippage between the gear carrier and ring gear. This slippage results in a still further slowing down of the speed of rotation of the gear carrier and a still further decrease of the centrifugal force. This continues until the valves are completely open permitting practically unrestricted flow of fluid so that there is very little tendency to resist relative rotation between the gear carrier and ring gear and this resistance becomes so slight that the clutch band 10 will hold the gear carrier against any movement whatever, the ring gear then revolving in a reverse direction, the friction shoe 11 being held out of engaging position by the slidable cone 14. The propeller shaft clutch member 19 may then be disengaged from the clutch teeth 27 on the gear carrier 4, if desired.

Figure 1:
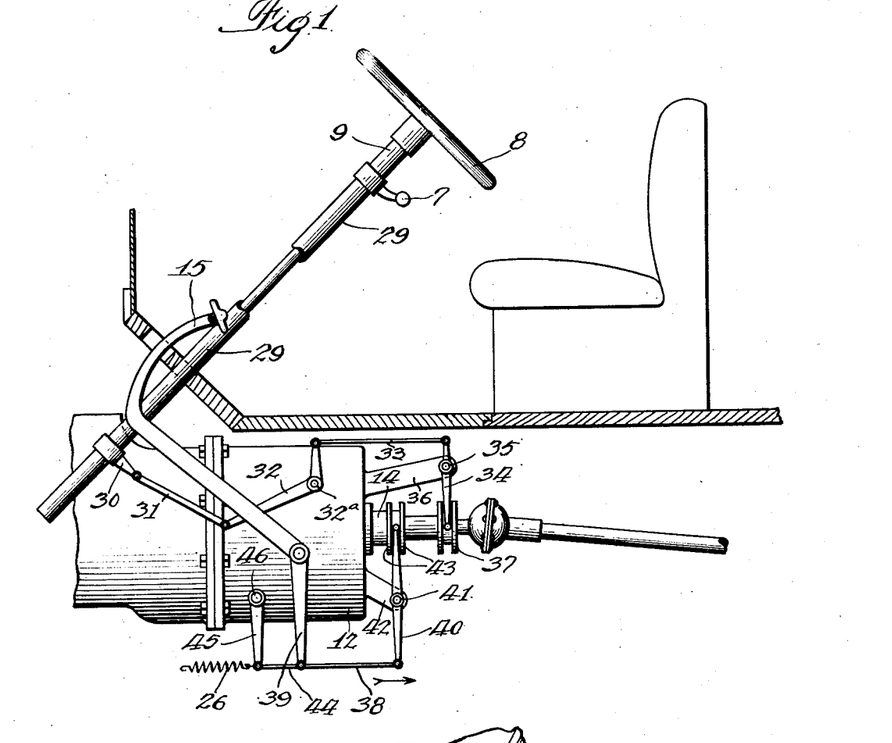
Figure 1 is a vertical sectional view showing my improved transmission and control means in connection with parts of an automobile.

The clutch member 19 on the propeller shaft is shiftable alternatively into engagement with the clutch members 20 and 27 by means of the rock lever 7 and transmission therefrom including a sleeve 29 on which the rock lever 7 is mounted, a rock lever 30 mounted at the lower end of this sleeve, a link 31 having a pivotal connection with the rock arm, a bell-crank lever 32 pivotally connected with this link and pivotally mounted at 32a on the gear casing 12, a link 33 pivotally connected with this bell-crank lever, a rock lever 34 pivotally mounted at 35 on the bracket 36 and pivotally connected with the link, and a flanged collar 37 mounted on the propeller shaft between the flanges of which the lower end of the rock lever 34 engages.

The slidable cone 14 is shiftable back and forth by the pedal 15 and transmission therefrom including a link 38 pivotally connected with the downwardly extending arm 39, and a rock lever 40 pivotally mounted at 41 on a bracket 42 on the gear casing 12, the upper end of which lies between the flanges 43 on the slidable cone. The gripping band 10 is operated from the pedal 15 by means of a link 44 pivotally connected with the lower end of the rock arm 39, a rock arm 45 pivotally connected with this link, a rock shaft 46 to which this arm is secured, a pair of face cam members 47 rockable with this shaft, and a pair of face cam members 48 secured to the ends of the gripping band 10 and cooperating with the cam face members 47 on the rock shaft in such a way that when the pedal 15 is depressed the gripping band 10 will be contracted. In order to release the gripping band when the pedal 15 is released, a coil compression spring 49 is provided surrounding the rock shaft 46 and tending to force the ends of the gripping band away from each other.

In order to utilize some of the energy of the flowing oil, the outlet of the oil passage 16 is so directed with respect to the teeth of the internal ring gear as to have a turbine effect thereon tending to cause rotation of the ring gear.

Figure 3:
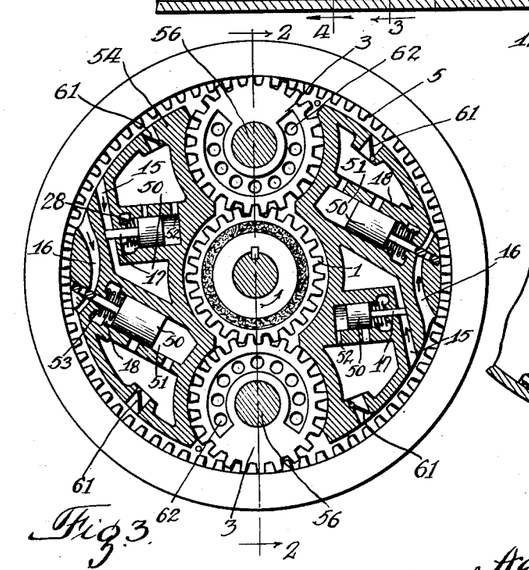
Figure 3 is a transverse sectional view on the line 3—3 of Figure 2.

In order to cause the proper amount of centrifugal force to be exerted on the valves 17 and 18, suitable weights 50 are provided on which these valves are mounted, these weights being slidably mounted in cylindrical pockets 51 in a casting forming a part of the gear carrier. Suitable ports 52 are provided for these cylinders to permit the oil flow to allow the required movement of the slidable weights. The coil compression springs 28 and 53 resisting the centrifugal force acting on these valves are so designed as to give the desired closing effect for the valve.

The gear carrier 4 comprises the central casting 54 referred to above and two side plate members 55 between which this central casting 54 is mounted and to which it is rigidly secured. The planet gears 3 fit snugly between these side plate members 55 and are rotatably mounted on pins 56 secured to the side plate members.

In order to prevent excess leakage of oil, suitable spring pressed packing rings 57 are provided, two of these being mounted in the face of the sun gear 1 and two of them being mounted in the side plates 58 of the ring gear, which fit snugly against the side plates 55 of the gear carrier.

Figure 4:
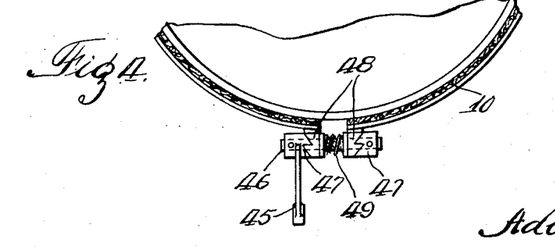
Figure 4 is a fragmentary sectional view on the line 4—4 of Figure 2.
Figure 5:
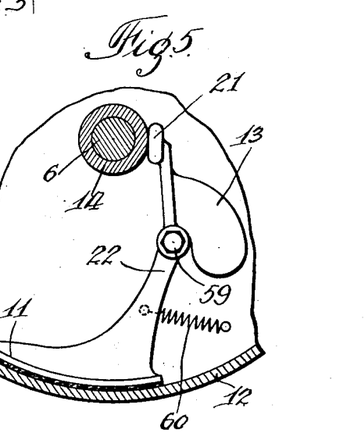
Figure 5 is a fragmentary sectional view on the line 5—5 of Figure 2.

The lever 22 is pivotally mounted on the ring gear at 59 and a light tension spring 60 is provided, the tendency of which is to hold the friction shoe 11 in engagement with the gear casing 12.

In order to prevent free movement of the transmission parts during over-running of the propeller shaft 6 check valves 61 are provided in the oil passage. Over-running tends to cause the ring gear 5 to travel in the same direction at an increased rate of speed. This action causes the oil to circulate in the opposite direction. Therefore, the check valves 61 will create a hydraulic barrier, producing a locked condition.

In order to assist the tendency of this transmission to rotate as a unit at high speeds, I may provide an eccentric weighting of the planet gears by lightening them on one side, as indicated at 62, so that the tendency of these planet gears is to come to rest with the weighted sides farthest from the axis of rotation.

By properly designing the weighted valves and springs and the oil passages, the desired ratios for the various engine speeds may be obtained. These values may be worked out by means of a known formula not necessary to be incorporated in this application.

Figures 3, 7, 8:
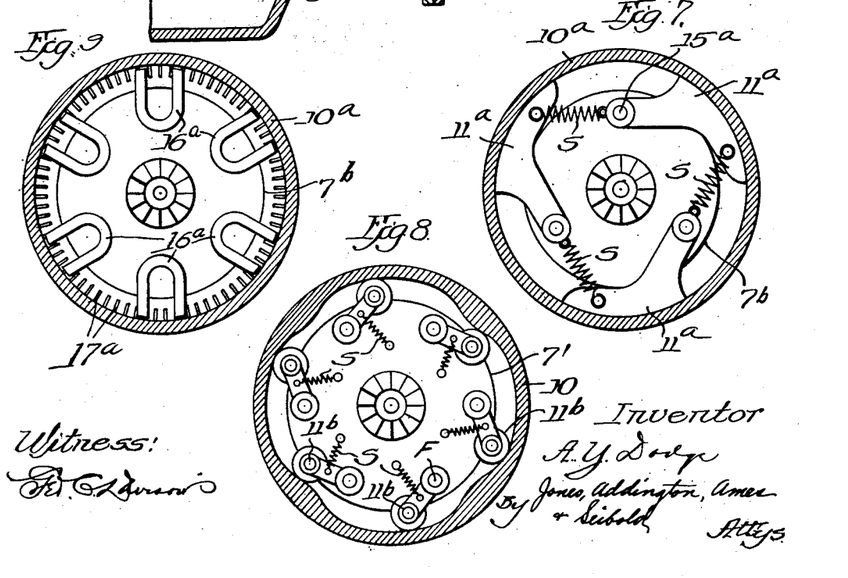
Figures 7 and 8 are vertical sections showing speed controlled means for assisting in the control.
Figure 6:
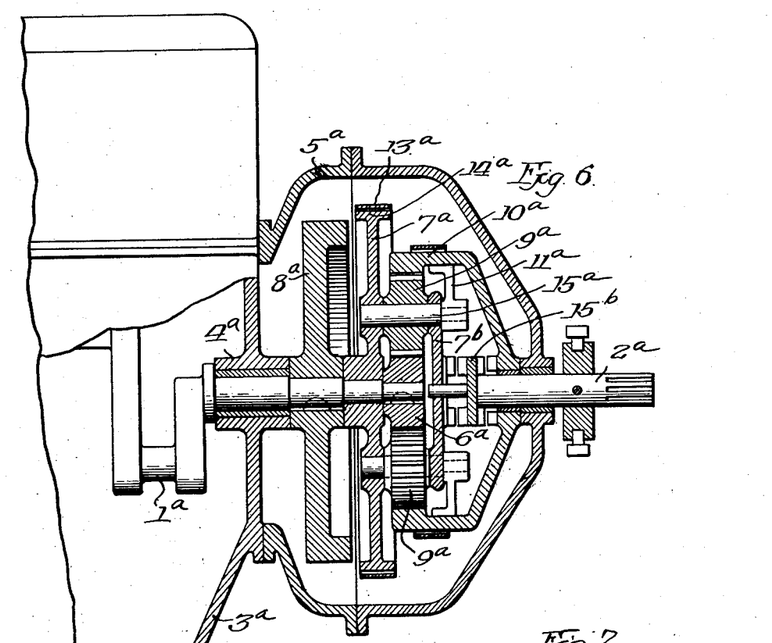
Figure 6 is a vertical axial view showing another form of transmission associated with the crank shaft and propeller shaft.

Referring to Figures 6, 7, and 8, the construction shown therein comprises a driving member 1a, which may be the crank shaft of the motor of an automobile, a driven member 2a coaxial with the driving member, which may be the propeller shaft of the automobile, and transmission means between the crank shaft and propeller shaft whereby practically any forward speed of the propeller shaft may be secured up to the speed of the crank shaft, and whereby when desired a reverse movement of the propeller shaft with respect to the crank shaft may be secured.

The crank shaft is shown in a crank case 3a and provided with a crank shaft bearing 4a. The transmission may be in a suitable housing 5a secured to the crank case. The transmission comprises a driving pinion 6a secured to rotate with the crank shaft, a spider or gear carrier 7a rotatably mounted on the crank shaft adjacent the fly-wheel 8a, a set of planetary gears 9a mounted on the gear carrier 7a and meshing with the pinion, an internal gear 10a mounted free to turn on the propeller shaft 2a, and meshing with the planetary gears, friction shoes 11a mounted to revolve with the gear carrier 7a, and frictionally engaging ring 10a for variably controlling the speed of the propeller shaft, and when desired speed is reached bringing it up to the speed of the crank shaft, and a band brake 13a cooperating with a brake surface 14a on the gear carrier 7a to effect reverse movement of the propeller shaft with respect to the crank shaft when desired.

The friction shoes 11a are secured to the gear carrier 7a by means of the pins 15a on which the planetary gears 9a are mounted. The planetary gears, friction shoes 11a, and gear carrier 7a are so related to the pins 15a on which the planetary gears are mounted that when the speed of the gear carrier 7a increases to a speed sufficient to overcome the springs 8, the shoes 11a, or rollers 11b, are thrown into engagement with the friction surface of the ring 10a by centrifugal force. So long as the propeller shaft 2a is stationary and the crank shaft 1a is revolving, the gear carrier 7a also will be revolving but at a speed very much less than the speed of a crank shaft, in accordance with the well-known laws governing planetary gear transmission.

When, as outlined above, the clutch 15b is allowed to be pressed into engagement with the disc 7b, the propeller shaft 2a will begin to rotate when shoes 11a contact ring 10a, slowly at first, and this rotation of the propeller shaft will gradually increase in speed until the propeller shaft is rotating at the same speed as the gear carrier 7a, and the gear carrier is rotating at the same speed as the crank shaft. Relative rotation between the gear carrier and ring 10a is opposed by the friction of shoes 11a and consequently the tendency of this friction is to prevent relative rotation between the crank shaft and gear carrier. The accelerating action is that the gear carrier is gradually brought up to the same speed as the crank shaft and the propeller shaft is at the same time gradually brought up to the speed of the gear carrier.

To effect a reverse movement of the propeller shaft with respect to the crank shaft, the clutch is shifted rearward into engagement with ring 10a extended, and the band brake 13a is applied to hold the gear carrier against rotation. This results in a reverse movement of the propeller shaft 2a with respect to the crank shaft 1a in accordance with the well known laws of planetary gearing, the reverse movement of the propeller shaft, however, being at a considerably lower speed than the forward speed of the crank shaft, the ratio being that of the pitch diameter of the pinion to the pitch diameter of the ring gear.

The speed controlled means comprise a centrifugal governor construction, shoes 11a, or rollers 11b. Under certain conditions this centrifugal governor construction will automatically control the slippage between the carrier 7a and the friction surface 10a, thus automatically controlling the speed ratio between the crank shaft 1a and the propeller shaft 2a. Thus, in going up hill, the crank shaft speed will decrease and the propeller shaft will decrease also and this will lessen the pressure which the shoes 11a exert against the ring 10a, and consequently lessen the pressure of the friction surface. This decrease of the pressure lessens the friction between the surface and permits slippage between the shoes 11a and the ring 10a, the slippage increasing as the propeller shaft speed decreases. This permits the engine to run at a speed which may be considerably greater than the propeller shaft speed, thus automatically putting the transmission in lower gear.

In Figure 9 is shown a construction which is substantially the same as that shown in Figure 6, except that in addition to the friction between shoes 11a and ring 10a a magnetic drag is provided which tends to prevent relative rotation between the disc 7b and the ring 10a. This magnetic drag construction comprises a plurality of permanent horseshoe magnets 16a secured to rotate with the disc 7b and a plurality of loop conductors 17a which may be secured on a mounting ring 10a or fastened to the inner edge of the friction ring 10a. When slippage takes place between the armature loops and magnets the lines of magnetic force are cut by the conductors, resulting in a magnetic drag as is well understood in connection with such constructions.

This transmission is to be lubricated by filling the case 5a with oil to a desired level, in which case the gripping band works in oil. As an optional construction I have provided means whereby the inner housing formed by the ring 10a and the head and end of the ring 10a may be partly filled with oil.

In operation—assuming it is desired to proceed ahead, if the engine is running and if the dog clutch is left in neutral position, the whole assembly of gears, etc., are free to revolve with the crank shaft 1a. To shift into low forward speed tighten the gripping band 13a in order to stop or practically stop 7a and 7b, and shift the dog clutch forward into engagement with 7b. Allow the band 13a to open. Next, close the low speed band into engagement with the ring 10a whereupon the car accelerates to a predetermined speed. Allow the low speed band to open. Hereafter the automobile feature will function.

To further accelerate, merely open the throttle to speed up the engine.

It is not necessary to put the dog clutch in neutral to stop, or after stopping, if not desired. To stop, merely throttle the engine down low and apply the brakes, thus causing the ring gear 10a to turn freely in reverse direction.

This transmission can be used without shifting the dog clutch for ahead or reverse movements in level places which are paved, as follows:

Put the dog clutch in rearward position in contact with the ring gear 10a (extended). When in this position, the car standing still and engine idling, the gears 9a and spider 7a and 7b turn freely. To advance, merely speed up the engine which throws the shoes 11a into engagement. To stop, close the throttle and apply the brakes. The engine will continue to idle and the car will stop. To reverse, cause the band 13a to contract about the ring 7a. To stop, allow the band 13a to expand free, throttle the engine, and apply the brakes of the car. To start ahead, speed the engine up and the car will proceed ahead.

Should the car be on a rough road and going up-grade, it may be necessary to shift the dog clutch into low speed by setting it ahead into engagement with 7b, as explained first. This shift can be made with the car in motion by manipulating the engine speed just as is now being practiced with sliding gear transmission, but can be more easily done with a suitable type of dog clutch, than with sliding gears. When the transmission is set in this position with the dog clutch in engagement with 7b, the transmission can be so used without change until desired, just as first described.

Figures 10, 11, 12:
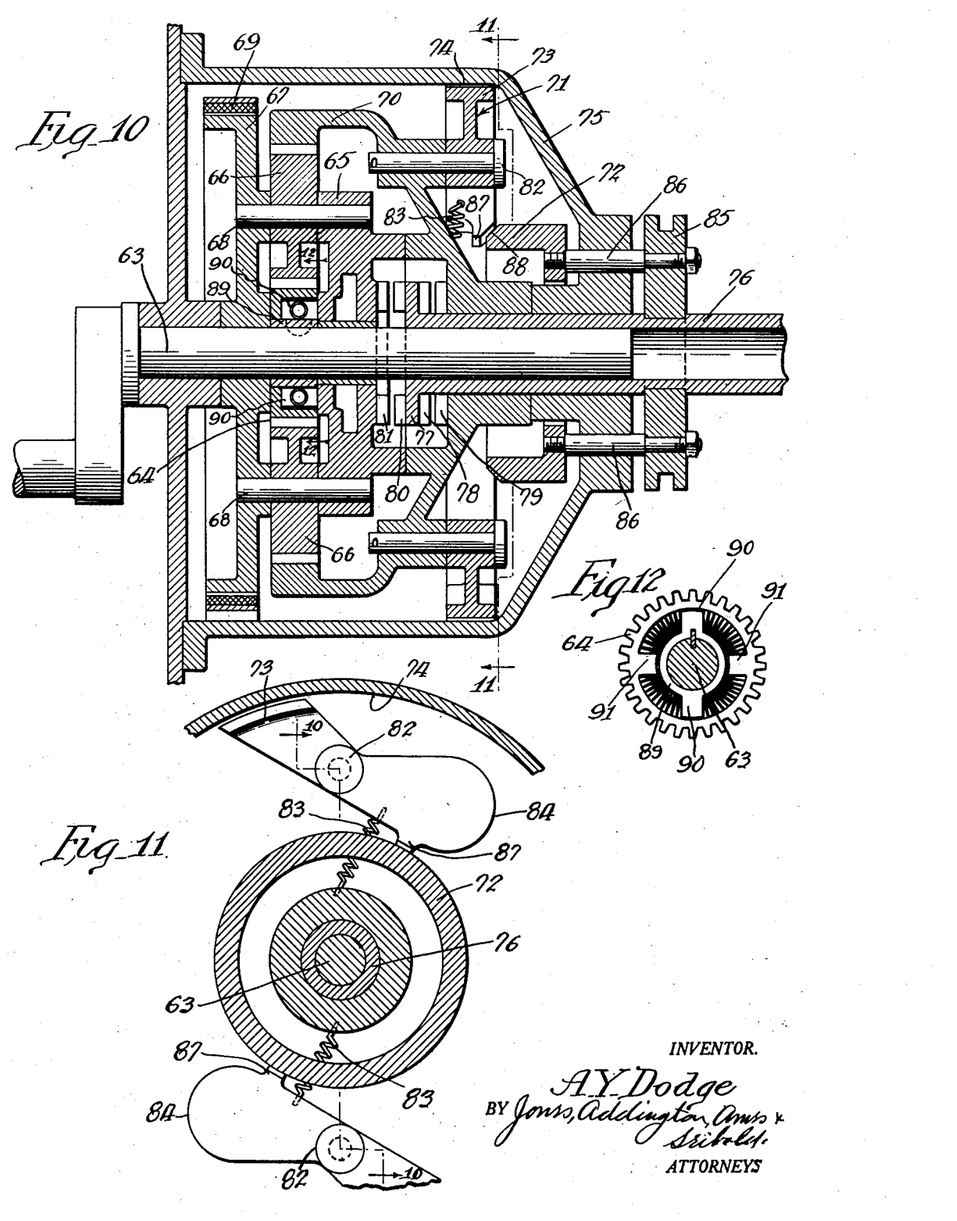
Figure 10 is an axial section showing another form of my invention embodying a planetary gear construction, an impulse transmission construction, and a one-way reactance clutch.
Figure 11 is a section on the line 11—11 of Figure 10.
Figure 12 is a section on the line 12—12 of Figure 10.

Referring now to Figures 10 and 11, the construction shown therein comprises a crank shaft 63 which may be that of an internal combustion engine, a driving sun gear 64 connected thereto, a gear carrier 65 rotatably mounted on and with respect to the crank shaft 63, planetary gearing 66 mounted on said gear carrier and meshing with the sun gear, a drum 67 secured to rotate with the gear carrier by means of the pins 68 on which the planetary gears are mounted, a gripping band 69 for holding the clutch drum against rotation when desired to effect reverse rotation of the ring gear 70 which meshes with the planetary gearing 66 and one-way reactance impulse rectifying means 71 controlled by centrifugal force for preventing reverse rotation of the ring gear and rectifying the impulses of the weighted planetary gearing 66. A coaxially shiftable control ring 72 is provided for holding the friction shoes 73 of the one-way reactance device out of engagement with the friction surface 74 on the transmission housing 75 when desired to permit reverse rotation of the ring gear 70 when the gripping band 69 is holding the gear carrier 65 against rotation.

The driven member 76 is provided with a dog clutch head 77 which can be shifted axially to occupy any one of three different positions. In the central position, as shown, this clutch head is in neutral. If it is shifted to the right, the clutch teeth 78 on the clutch head will engage with correspondingly shaped clutch teeth 79 on the ring gear and when the clutch head is shifted to the left, the clutch teeth 80 on the clutch head will engage with the clutch teeth 81 on the gear carrier 65.

The friction shoes 73 of the one-way reactance device are pivotally mounted on pins 82 secured to the ring gear. Light springs 83 are provided for normally holding the friction shoes in engagement with the friction surface 74. In order to prevent the friction shoes from engaging the friction surface when the ring gear attains speed, the friction shoes are counterweighted, as indicated at 84, so that when the ring gear reaches a certain speed the centrifugal force effect of these counterweights will overcome the light springs and will cause the friction shoes 73 to move out of frictional engagement with the friction surface 74.

The controlling ring 72 may be moved axially by means of an axially shiftable member 85 secured to the ends of the slide pins 86 on which the control ring 72 is mounted. When the control ring is in the position shown in Figure 10, it is out of operative relation with respect to the fingers 87 on the friction shoes and the friction shoes 73 are, under these conditions, controlled by the light springs 83 and counterweights 84. However, prior to the gripping of the drum 67 by the band 69, the control ring 72 is shifted to the left, as viewed in Figure 10, to cause the beveled surface 88 of the control ring to engage the beveled fingers 87 on the clutch shoes to force the beveled fingers outwardly against the action of the light springs 83 and thus move the friction shoes 73 out of frictional engagement with the friction surface 74.

In this form, the driven member is shifted to connect the clutch head 77 with the gear carrier 65 for all forward speeds. The band 69 is loosened to permit the gear carrier 65 to rotate freely. As the crank shaft 63 rotates, it will cause the gear carrier 65 to rotate at a lower speed because the ring gear 70 is held against reverse rotation by means of the one-way reactance device 71. As the speed of the crank shaft increases, impulses of the counter-weighted planetary gears 66 will start the ring gear 70 to rotating and as these impulses are rectified by the reactance clutch construction 71, the ring gear will continue to increase in speed until it catches up with the speed of the gear carrier 65. When this condition is attained, the sun gear 64, gear carrier 65 and ring gear 70 will rotate as a unit.

At a certain stage in the increase of speed of the ring gear, the friction shoes 73 of the reactance device will cease to engage the friction surface 74 because of the action of the counterweights 84 so that there will be no retarding action. In rectifying the impulses of the planetary gearing 66, an increase in torque is effected in acordance with the laws governing one-way reactance devices. There are thus two torque increases in series in this transmission, one between the sun gear 64 and gear carrier 65, due to the gear reduction of the planetary gearing itself, and the other due to the torque increase of the one-way reactance device.

For reverse, the clutch head 77 is connected with the ring gear 70; the control ring 72 is shifted to the left to throw the one-way reactance device 71 out of commission, and the gripping band 69 is tightened to hold the drum 67 and consequently the gear carrier 65 against rotation. Under these conditions when the sun gear 64 is rotated by the crank shaft 63, the ring gear 70 is rotated in the reverse direction, thus driving the driven shaft 76 in a reverse direction.

If desired, an impulse equalizer, similar to that shown in my co-pending application, Serial No. 440,206, filed March 31, 1930, may be provided between the crank shaft 63 and the driving sun gear 64, this impulse equalizer comprising a collar 89 keyed to the crank shaft 63 and provided with a pair of outwardly extending vanes 90, and a plurality of cushion members located between these vanes 90 and the inwardly extending vanes 91 on the sun gear 64.

While I have shown various embodiments of my invention, it is obvious that it might be embodied in still other forms covered and defined in the appended claims.

The present application is a refiling of my abandoned application No. 493,950 filed November 7, 1930.

I claim:

1. A variable speed transmission comprising a rotatable driving member, a rotatable driven member coaxial therewith, a gear secured to rotate with the driving member and coaxial therewith, a gear secured to rotate with the driven member and coaxial therewith, a gear carrier coaxial with said gears, gearing mounted on said gear carrier and meshing with both said coaxial gears and means controlled automatically by the speed of the driven member for variably controlling the relative rotation of said gear carrier with respect to said driven gear, said means comprising friction shoes with greater self-actuation one way than the other, forming a centrifugal governor rotatable with said gear carrier member.

2. A variable speed transmission comprising a rotatable driving member, a rotatable driven member coaxial therewith, a gear secured to rotate wtih the driving member and coaxial therewith, a gear secured to rotate with the driven member and coaxial therewith, a gear carrier coaxial with said gears, gearing mounted on said gear carrier and meshing with both said coaxial gears, means for variably controlling the relative rotation of said gear carrier with respect to said driven gear, means whereby said variable control means may be rendered inactive to permit the driven member to stop and friction means for retarding said driven member applied when said variable control means are rendered inactive, and a dog clutch to shift engagement of the driven member from the ring gear to the gear carrier for the purposes set forth.

3. A variable speed transmission comprising a driving gear, a rotatable gear carrier coaxial with said gear, gearing mounted on said gear carrier and meshing with said driving gear, a reversible gear coaxial with said driving gear and meshing with said gearing, means for holding said gear carrier against movement to cause reverse movement of the reversible gear, and means controlled by centrifugal force and pivotally mounted on and with respect to said gear carrier and rotatable therewith and engageable with a friction surface which is rotatable with said reversible gear for effecting a graduated control of the relative rotation of said gear carrier with respect to said reversible gear to effect the desired forward speed ratio.

4. A variable speed transmission comprising a driving gear, a rotatable gear carrier coaxial with said gear, gearing mounted on said gear carrier and meshing with said driving gear, a reversible gear coaxial with said driving gear and meshing with said gearing, means for holding said gear carrier against movement to cause reverse movement of the reversible gear, and a driven member alternatively connectible to rotate either with the gear carrier or with the reversible gear, said reversible gear and gear carrier being provided with clutch members respectively, a single axially shiftable clutch member shiftable between the clutch members on the reversible gear and gear carrier for effecting said alternative connection and means for simultaneously operating said means for holding the gear carrier to holding position and said shiftable clutch member into engagement with the reversible gear.

5. A variable speed transmission comprising a rotatable driving shaft, a sun gear mounted thereon, a set of planet gears meshing with said sun gear, a rotatable gear carrier on which said planet gears are mounted, a ring gear meshing with said planet gears, a fluid confining and conducting device mounted on said gear carrier and cooperating with said sun gear, planet gears, and ring gear to form a fluid pump, said fluid confining device having circular confining surfaces adjacent the planet gears and having a liquid obstructing portion adjacent the ring gear and a passage around said obstructing portion, and a member carried by said gear carrier controlled by centrifugal force for variably restricting the flow through said passage in accordance with the speed of rotation of the gear carrier.

6. A variable speed transmission comprising intermeshing toothed gearing, means cooperating with the teeth of said gearing to provide fluid propelling means, means for controlling the fluid flow to vary the speed of transmission, and means for directing the fluid against the teeth of the gearing to cause the gearing to act as a fluid motor.

7. An automobile transmission construction comprising a planetary transmission having a driving sun gear, a planet gear meshing therewith, a gear carrier rotatable about the axis of the sun gear on which the planet gear is mounted, and a driven gear meshing with the planet gear and coaxial with the gear carrier, a driven shaft connectible with the gear carrier for forward speed and connectible with the driven gear for reverse speed, means operable by the driver for alternatively connecting the driven shaft with the gear carrier or with the driven gear, means operable by the driver for holding the gear carrier against rotation to cause the driven gear to rotate in a direction reverse to that of the driving gear, friction means mounted on the driven gear and engageable with stationary means tending to hold the driven gear against movement to cause rotation of the gear carrier for low speed forward, means actuated by centrifugal force for freeing the friction means at high speed of the driven gear, means whereby when the gear carrier is held against rotation for reverse speed said friction means will be freed, and means rotatable with the gear carrier and controlled by centrifugal force tending to cause the driven gear to rotate with the gear carrier for high speed forward.

8. An automobile transmission construction comprising a planetary transmission having a driving sun gear, a planet gear meshing therewith, a gear carrier rotatable about the axis of the sun gear on which the planet gear is mounted, and a driven gear meshing with the planet gear and coaxial with the gear carrier, a driven shaft connectible with the gear carrier for forward speed and connectible with the driven gear for reverse speed, means operable by the driver for alternatively connecting the driven shaft with the gear carrier or with the driven gear, means operable by the driver for holding the gear carrier against rotation to cause the driven gear to rotate in a direction reverse to that of the driving gear, friction means mounted on the driven gear and engageable with stationary means tending to hold the driven gear against movement to cause rotation of the gear carrier for low speed forward, means actuated by centrifugal force for freeing the friction means at high speed of the driven gear, means whereby when the gear carrier is held against rotation for reverse speed said friction means will be freed, and means controlled by centrifugal force tending to cause the driven gear to rotate with the gear carrier for high speed forward.

9. An automobile transmission construction comprising a planetary transmission having a driving sun gear, a planet gear meshing therewith, a gear carrier rotatable about the axis of the sun gear on which the planet gear is mounted, and a driven gear meshing with the planet gear and coaxial with the gear carrier, a driven shaft connectible with the gear carrier for forward speed and connectible with the driven gear for reverse speed, means operable by the driver for alternatively connecting the driven shaft with the gear carrier or with the driven gear, means operable by the driver for holding the gear carrier against rotation to cause the driven gear to rotate in a direction reverse to that of the driving gear, friction means mounted on the driven gear and engageable with stationary means tending to hold the driven gear against movement to cause rotation of the gear carrier for low speed forward, means actuated by centrifugal force for freeing the friction means at high speed of the driven gear, means whereby when the gear carrier is held against rotation for reverse speed said friction means will be freed, and means rotatable with the gear carrier and tending to cause the driven gear to rotate with the gear carrier for high speed forward.

10. An automobile transmission construction comprising a planetary transmission having a driving sun gear, a planet gear meshing therewith, a gear carrier rotatable about the axis of the sun gear on which the planet gear is mounted, and a driven gear meshing with the planet gear and coaxial with the gear carrier, a driven shaft connectible with the gear carrier for forward speed and connectible with the driven gear for reverse speed, means operable by the driver for alternatively connecting the driven shaft with the gear carrier or with the driven gear, means operable by the driver for holding the gear carrier against rotation to cause the driven gear to rotate in a direction reverse to that of the driving gear, friction means mounted on the driven gear and engageable with stationary means tending to hold the driven gear against movement to cause rotation of the gear carrier for low speed forward, means actuated by centrifugal force for freeing the friction means at high speed of the driven gear, means whereby when the gear carrier is held against rotation for reverse speed said friction means will be freed, and means tending to cause the driven gear to rotate with the gear carrier for high speed forward.

11. An automobile transmission construction comprising a planetary transmission having a driving sun gear, a planet gear meshing therewith, a gear carrier rotatable about the axis of the sun gear on which the planet gear is mounted, and a driven gear meshing with the planet gear and coaxial with the gear carrier, a driven shaft connectible with the gear carrier for forward speed and connectible with the driven gear for reverse speed, means operable by the driver for alternatively connecting the driven shaft with the gear carrier or with the driven gear, means operable by the driver for holding the gear carrier against rotation to cause the driven gear to rotate in a direction reverse to that of the driving gear, means for holding the driven gear against movement to cause rotation of the gear carrier for low speed forward, and means whereby when the gear carrier is held against rotation for reverse speed, said means for holding the driven gear will be released, said means for alternatively connecting comprising an oscillatable shaft substantially coaxial with the steering column.

12. An automobile transmission construction comprising a planetary transmission having a driving sun gear, a planet gear meshing therewith, a gear carrier rotatable about the axis of the sun gear on which the planet gear is mounted, and a driven gear meshing with the planet gear and coaxial with the gear carrier, a driven shaft connectible with the gear carrier for forward speed and connectible with the driven gear for reverse speed, means operable by the driver for alternatively connecting the driven shaft with the gear carrier or with the driven gear, means operable by the driver for holding the gear carrier against rotation to cause the driven gear to rotate in a direction reverse to that of the driving gear, means for holding the driven gear against movement to cause rotation of the gear carrier for low speed forward, and means whereby when the gear carrier is held against rotation for reverse speed, said means for holding the driven gear will be released, said means for alternatively connecting comprising an oscillatable shaft substantially coaxial with the steering column, and a lever mounted on said shaft adjacent the steering wheel.

13. A transmission construction comprising a sun gear, a planet gear, a gear carrier for the planet gear and a gear meshing with the planet gear and coaxial with the gear carrier, a driven member alternatively connectible with said planet gear and said driven gear, means for holding said driven gear against reverse rotation to cause relative slow rotation of the gear carrier, means for holding the gear carrier against rotation to cause reverse rotation of the driven gear, means whereby when the driven gear is held against rotation the gear carrier will be free and whereby when the gear carrier is held against rotation the driven gear will be freed, and fluid means for variably controlling relative rotation between the gear carrier and the driven gear.

14. A transmission construction comprising a sun gear, a planet gear, a gear carrier for the planet gear and a gear meshing with the planet gear and coaxial with the gear carrier, a driven member alternatively connectible with said planet gear and said driven gear, means for holding said driven gear against reverse rotation to cause relative slow rotation of the gear carrier, means for holding the gear carrier against rotation to cause reverse rotation of the driven gear, means whereby when the driven gear is held against rotation the gear carrier will be free and whereby when the gear carrier is held against rotation the driven gear will be freed, and fluid flow means rotatable with the gear carrier and controlled by centrifugal force for variably controlling the relative rotation between the gear carrier and the driven gear.

15. A variable speed transmission comprising epicyclic gearing having intermeshing teeth, means for controlling the speed ratio between a driving member and a driven member comprising a fluid passage and means for varying the effective area of said passage to vary the flow therein, and means whereby said teeth simultaneously act as a fluid pump to cause fluid to flow through said passage and effect a torque reaction between the intermeshing teeth, to act as a mechanical transmission.

16. A variable speed transmission comprising a driving gear, a rotatable gear carrier coaxial with said gear, gearing mounted on said gear carrier and meshing with said driving gear, a reversible gear coaxial with said driving gear and meshing with said gearing, means for holding said gear carrier against movement to cause reverse movement of the reversible gear, and a driven member alternatively connectible to rotate either with the gear carrier or with the reversible gear, and means for effecting a graduated control of the relative rotation between the gear carrier and reversible gear to effect variable forward speed, comprising a fluid circulation passage, and means for variably restricting the flow in said passage.

17. A variable speed transmission comprising a driving gear, a rotatable gear carrier coaxial with said gear, gearing mounted on said gear carrier and meshing with said driving gear, a reversible gear coaxial with said driving gear and meshing with said gearing means for holding said gear carrier against movement to cause reverse movement of the reversible gear, and a driven member alternatively connectible to rotate either with the gear carrier or with the reversible gear, and means for effecting a graduated control of the relative rotation between the gear carrier and reversible gear to effect variable forward speed, comprising a fluid circulation passage, and means for variably restricting the flow in said passage, comprising centrifugal force means.

18. A variable speed transmission comprising a driving gear, a rotatable gear carrier coaxial with said gear, gearing mounted on said gear carrier and meshing with said driving gear, a reversible gear coaxial with said driving gear and meshing with said gearing, means for holding said gear carrier against movement to cause reverse movement of the reversible gear, and a driven member alternatively connectible to rotate either with the gear carrier or with the reversible gear, and means for effecting a graduated control of the relative rotation between the gear carrier and reversible gear to effect variable forward speed, comprising a fluid circulation passage, and means for variably restricting the flow in said passage, comprising centrifugal force means rotatable with the gear carrier.

19. A variable speed transmission comprising a driving gear, a rotatable gear carrier coaxial with said gear, gearing mounted on said gear carrier and meshing with said driving gear, a ring gear meshing with said gearing, said gear carrier and ring gear cooperating to form a fluid reservoir in which the driving gear and gearing operate, and means for controlling the precession of the driving gear with respect to the gear carrier, comprising a fluid passage in communication with said reservoir, and means for controlling the flow in said passage.

20. A variable speed transmission comprising a driving gear, a rotatable gear carrier coaxial with said gear, gearing mounted on said gear carrier and meshing with said driving gear, a ring gear meshing with said gearing, said gear carrier and ring gear cooperating to form a fluid reservoir in which the driving gear and gearing operate, and means for controlling the precession of the driving gear with respect to the gear carrier, comprising a fluid passage in communication with said reservoir, and means for controlling the flow in said passage, said gear carrier comprising opposed plates embracing said gearing.

21. A variable speed transmission comprising a driving gear, a rotatable gear carrier coaxial with said gear, gearing mounted on said gear carrier and meshing with said driving gear, a ring gear meshing with said gearing, said gear carrier and ring gear cooperating to form a fluid reservoir in which the driving gear and gearing operate, and means for controlling the precession of the driving gear with respect to the gear carrier, comprising a fluid passage in communication with said reservoir, and means for controlling the flow in said passage, said gear carrier comprising opposed plates embracing said gearing, said ring gear comprising opposed plates embracing the gear carrier.

22. A variable speed transmission comprising a driving gear, a rotatable gear carrier coaxial with said driving gear, gearing mounted on said gear carrier and meshing with said driving gear, a driven gear coaxial with said driving gear and meshing with said gearing, whereby said driving gear may precess with respect to said gear carrier and said gear carrier may precess with respect to said driven gear, said gear carrier and driven gear being capable of simultaneous absolute and relative rotation, and means for controlling the amount of precession of the gear carrier with respect to the driven gear, while said gear carrier and driven gear are in simultaneous, absolute and relative rotation, comprising a fluid passage and means whereby the flow in said passage varies with the amount of said precession, and means for variably controlling the flow in said passage.

23. A variable speed transmission comprising a driving gear, a rotatable gear carrier coaxial with said driving gear, gearing mounted on said gear carrier and meshing with said driving gear, a driven gear coaxial with said driving gear and meshing with said gearing, whereby said driving gear may precess with respect to said gear carrier and said gear carrier may precess with respect to said driven gear, said gear carrier and driven gear being capable of simultaneous absolute and relative rotation, and means for controlling the amount of precession of the gear carrier with respect to the driven gear, while said gear carrier and driven gear are capable of absolute and relative rotation, comprising a fluid passage and means whereby the flow in said passage varies with the amount of said precession, and centrifugal force means for variably controlling the flow in said passage.

24. A variable speed transmission comprising a driving gear, a rotatable gear carrier coaxial with said driving gear, gearing mounted on said gear carrier and meshing with said driving gear, a driven gear coaxial with said driving gear and meshing with said gearing, whereby said driving gear may precess with respect to said gear carrier and said gear carrier may precess with respect to said driven gear, said gear carrier and driven gear being capable of simultaneous absolute and relative rotation, and means for controlling the amount of precession of the gear carrier with respect to the driven gear, while said gear carrier and driven gear are capable of absolute and relative rotation, comprising a fluid passage and means whereby the flow in said passage varies with the amount of said precession, and centrifugal force means for variably controlling the flow in said passage, rotatable with the gear carrier.

25. A variable speed transmission comprising a driving gear, a rotatable gear carrier coaxial with said driving gear, gearing mounted on said gear carrier and meshing with said driving gear, a driven gear coaxial with said driving gear and meshing with said gearing, whereby said driving gear may precess with respect to said gear carrier and said gear carrier may precess with respect to said driven gear, said gear carrier and driven gear being capable of simultaneous absolute and relative rotation, and means for controlling the amount of precession of the gear carrier with respect to the driven gear, while said gear carrier and driven gear are capable of absolute and relative rotation, comprising a fluid passage and means whereby the flow in said passage varies with the amount of said precession, and means for variably controlling the flow in said passage, automatic means for holding the reversible gear against reverse rotation, automatic releasable for forward rotation of the reversible gear.

26. A variable speed transmission comprising planetary alternating impulse, centrifugal force transmission, one-way reactance means for rectifying all reversely acting impulses, said planetary transmission comprising eccentrically loaded planet gearing, a driving gear meshing with said planet gearing and a driven gear meshing with said planet gearing, and speed responsive means for rendering said one-way reactance means inoperative at high speed.

27. A variable speed transmission comprising planetary alternating impulse, centrifugal force transmission, one-way reactance means for rectifying the reversely acting impulses, said planetary transmission comprising eccentrically loaded planet gearing, a driving gear meshing with said planet gearing, a driven gear meshing with said planet gearing, a carrier for said planet gearing, means for selectively rendering said one-way reactance means ineffective, and means for selectively holding said carrier against rotation to effect reverse rotation of said driven gear, said last two means being interconnected for simultaneous operation.

28. A variable speed transmission comprising planetary alternating impulse, centrifugal force transmission, one-way reactance means for rectifying the reversely acting impulses, said planetary transmission comprising eccentrically loaded planet gearing, a driving gear meshing with said planet gearing, a driven gear meshing with said planet gearing, said one-way reactance means comprising means for rectifying the reversely acting impulses in all positions of the planetary transmission, and speed responsive means for automatically rendering said one-way reactance means inoperative.

29. A variable speed transmission comprising a driving shaft, a driven shaft, a planetary gear train, one of the elements of said train being connected with the driving shaft, means for selectively connecting either one of two other elements of said train with the driven shaft, means for holding one of said last named elements against rotation in one direction, means for holding the other element against rotation in either direction, and a single control member for simultaneously rendering said last named holding means operative and said first named holding means inoperative.

30. A variable speed transmission comprising intermeshing toothed gearing adapted to propel a fluid, centrifugal means associated with said gearing for producing alternating impulses, passages associated with said gearing to form a fluid circulating system, and speed responsive means to control the flow of fluid through said passages.

31. A variable speed transmission comprising relatively movable parts, intermeshing gear teeth on said parts adapted to propel a fluid, centrifugal means associated with one of said parts for producing alternating impulses, passages associated with said parts to form a fluid circulating system and means responsive to the speed of one of said parts for controlling the flow of fluid through said passages whereby resistance to relative movement of said parts is controlled.

32. A variable speed transmission comprising a gear carrier and a ring gear, pinions carried by said gear carrier and meshing with said ring gear, passages formed in said carrier and said ring gear forming a fluid circulating system and speed responsive means carried by said gear carrier for controlling flow of fluid through said passages whereby resistance to relative movement between said ring gear and said gear carrier is controlled.

33. A variable speed transmission comprising planetary gearing including a sun gear, a gear carrier and a ring gear, means for driving said sun gear, means for preventing rotation of said ring gear in one direction, means responsive to the speed of rotation of said gear carrier for variably resisting relative rotation between the gear carrier and the ring gear, and centrifugal means for releasing the means for preventing rotation of the ring gear whereby the ring gear is free to rotate at high speeds.

34. A variable speed transmission comprising planetary gearing including a sun gear, a gear carrier and a ring gear, means for driving said sun gear, means for preventing rotation of said ring gear in one direction and means responsive to the speed of rotation of said gear carrier for variably resisting relative rotation between the gear carrier and the ring gear, said last named means including friction shoes pivotally mounted on said gear carrier and adapted to engage said ring gear.

35. A variable speed transmission comprising a driving member, a driven member, planetary gearing connecting said members, means carried by one of the elements of said gearing and adapted to engage a stationary part to prevent rotation of said element in one direction and manual control means movable axially of the driven member for rendering said means inoperative at will.

36. In an infinitely variable-speed, torque-amplifying transmission, the combination of planetary gearing including a driving gear, a set of planetating gears coaxial therewith and a third gear meshing with the planetating gears, a driven member, means for alternately connecting the driven member with the planetating gears or the third gear, means for preventing rotation of the third gear in one direction, means for gradually increasing the speed of rotation of the planetating gears bodily about the center of the driving gear to effect intermediate ratios and centrifugal means for releasing the means for preventing rotation of the third gear whereby the third gear is free to rotate at high speeds.

37. A transmission for connecting a driving shaft to a driven shaft comprising a gear train, shiftable clutch means on the driven shaft for connecting it to one element of the gear train for forward rotation and to another element of the gear train for reverse rotation, one-way reactance mechanism for holding said last named element against reverse rotation when the driven shaft is connected for forward rotation, centrifugal means for automatically rendering said one-way mechanism inoperative, and manual means for simultaneously rendering said one-way mechanism ineffective to hold said element and shifting said clutch means into engagement with said element for reverse rotation.

38. A transmission for connecting a driving shaft to a driven shaft comprising a gear train, centrifugal alternating-impulse means associated therewith, one-way reactance means connected to said alternating-impulse means for absorbing reversely acting impulses, clutch means on the driven shaft for selectively connecting it to one element of the gear train for forward drive or to another element thereof for reverse drive and means operable at will simultaneously to render said one-way means ineffective and connect said clutch means to the element for reverse drive.

39. A variable speed transmission comprising planetary gearing including a sun gear, a gear carrier, and a ring gear, means for driving said sun gear, means for preventing rotation of said ring gear in one direction, passages formed in said carrier and said ring gear forming a fluid circulating system for resisting relative movement between the gear carrier and ring gear whereby the ring gear is urged in a forward direction and centrifugal means for releasing the means for preventing rotation of the ring gear whereby the ring gear is free to rotate at high speeds.

ADIEL Y. DODGE.